L. C. ROYER.
Grain-Separator.

No. 167,570. Patented Sept. 7, 1875.

WITNESSES:
P. C. Dieterich
W. C. McArthur

INVENTOR:
L. C. Royer
per T. H. Alexander
ATTORNEY.

N. PETERS, PHOTO-LITHOGRAPHER, WASHINGTON, D. C.

UNITED STATES PATENT OFFICE.

LOUIS C. ROYER, OF ROYERTON, INDIANA.

IMPROVEMENT IN GRAIN-SEPARATORS.

Specification forming part of Letters Patent No. 167,570, dated September 7, 1875; application filed February 25, 1875.

*To all whom it may concern:*

Be it known that I, L. C. ROYER, of Royerton, in the county of Delaware and State of Indiana, have invented certain new and useful Improvements in Separators; and I do hereby declare that the following is a full, clear, and exact description thereof, reference being had to the accompanying drawings, and to the letters of reference marked thereon, which form a part of this specification.

The nature of my invention consists in certain improvements upon the grain-separator for which Letters Patent No. 114,974 were granted to me May 16, 1871, as will be hereinafter more fully set forth.

In order to enable others skilled in the art to which my invention appertains to make and use the same, I will now proceed to describe the construction of the improvements I have made, as well as their operation, referring to the annexed drawing, in which—

Figure 1:
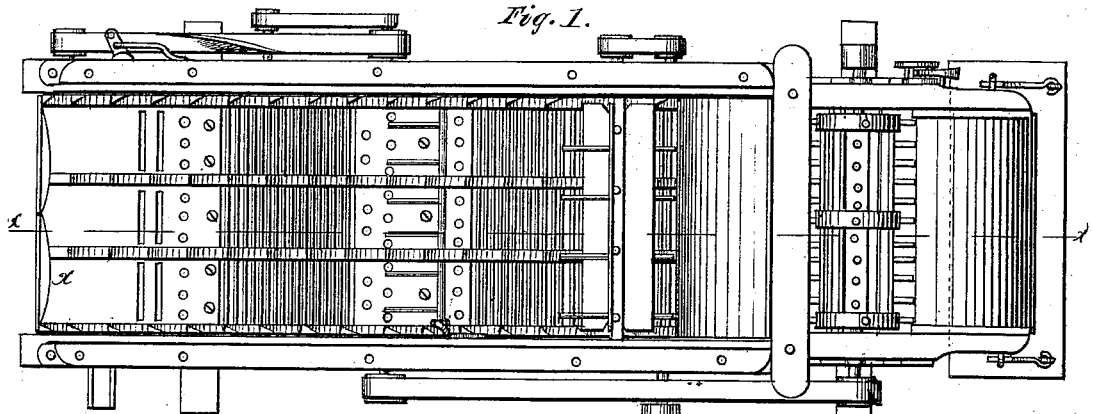
Figure 2:
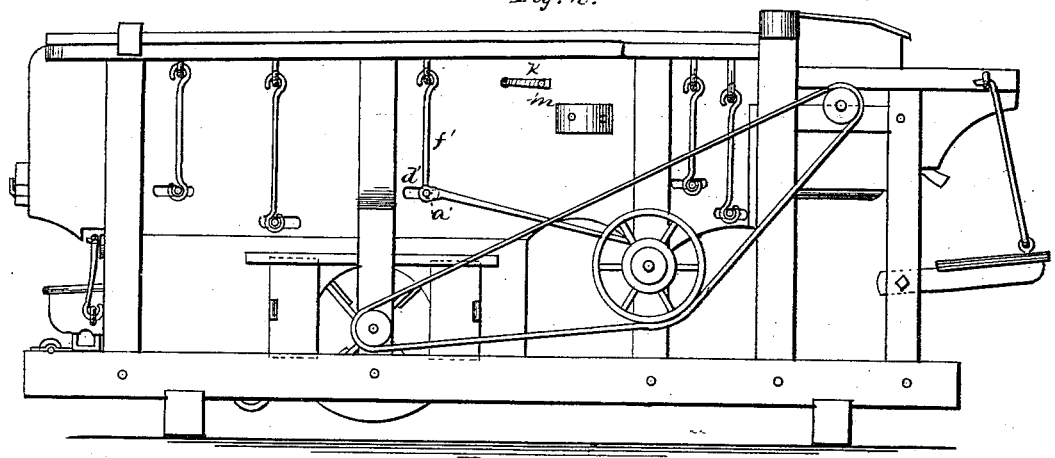
Figure 3:
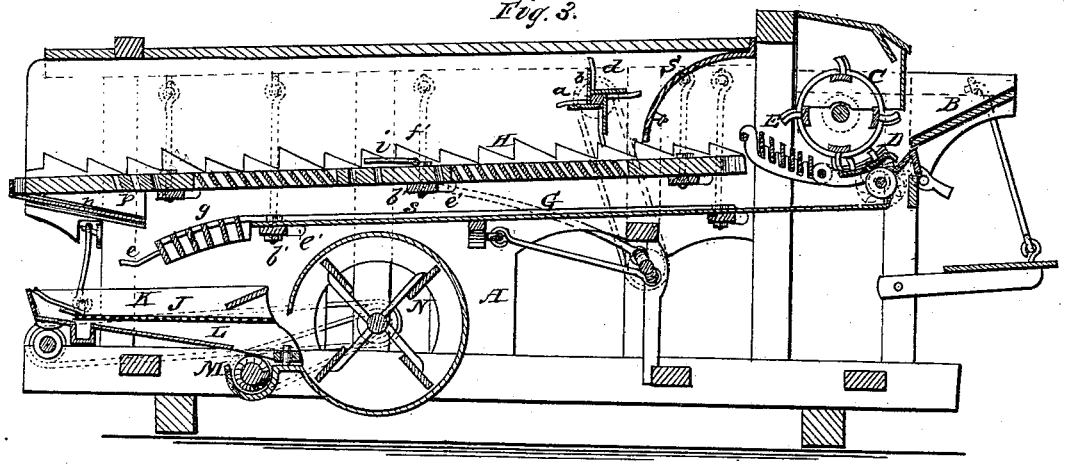
Figure 4:
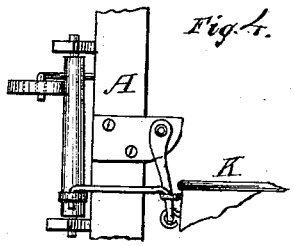

Figure 1 is a plan view of my improved grain-separator. Fig. 2 is a side elevation, and Fig. 3 a longitudinal vertical section, of the same. Fig. 4 is a detached view of a part of the operating mechanism.

A represents the frame of my machine with feed-table B at the front end. C is the spiked or toothed cylinder; D, the spiked concave, and E the grate upon which the grain falls after passing between the cylinder and concave. S is the straw-deflector for directing the straw to the shaker or straw-carrier H.

These parts are all constructed and operated in substantially the same manner as described in my former patent above referred to.

Immediately in rear of the straw-director S is situated a revolving rake, which consists of a shaft, $a$, having its bearings in the sides of the frame A, and upon said shaft are secured four wings or blades, $b\ b$, extending the entire width of the shaker H. On each blade $b$ are secured a series of wire teeth, $d$, which run across the blade and project beyond the blades a suitable distance, said projecting ends being curved or bent slightly, as shown in Fig. 3. This revolving rake pulls the straw from under the straw-deflector S, and prevents the machine from clogging at this point.

The shaker H is constructed the same as in my former patent, of a series of alternate perforated boards and inclined slats attached to the under edges of four parallel toothed bars. In one of the perforated boards of the shaker is made a groove, extending clear from end to end, and in this groove is placed a rod, $f$, which is held therein by the parallel toothed bars of the shaker. From the rod $f$ extends a series of straight parallel teeth, $i\ i$, the whole forming a rake for assisting in moving the straw on the shaker.

This rake is operated automatically in the following manner: From one end of the shaft $f$ projects an arm, $h$, within the frame, and to the outer end of the arm is connected a strap or cord, $k$, which passes out through the side of the machine, and fastened by a pin, $m$. As the shaker moves away from the thrashing-cylinder the rake $f\ i$ rises, and as the shaker returns the straw is prevented from following the shaker by the rake-teeth, which, as the shaker completes its return movement, falls down to be again raised up by the next movement of the shaker.

The amount of rise of the rake-teeth $i$ is easily regulated by simply changing the pin $m$ that holds the strap or cord $k$ in different holes in the side of the frame.

At the lower end of the shaker H on the under side are secured triangular pieces $p\ p$, in which are placed inclined slides $n\ n$, having their front edges turned upward along and against the edge of the shaker. In this edge of the shaker suitable openings $x\ x$ are cut, as shown in Fig. 1, so that the loose grain, which would otherwise pass out of the machine with the straw, will drop through these openings onto the slides $n$, and be by them carried back into the machine again and fall down on the sieve J of the shoe K. The grain after passing between the cylinder C and concave D falls through the grate E onto the grain-receiver G, which is provided with the grate $g$ and rake $e$ at the other end. In this case I construct the grain-receiver of thin boards, and along each side edge, on the upper side, is formed a bead, $s$. This bead is made by laying a rod on the receiver and covering the same with sheet metal, which is then fastened to the receiver by any suitable means. The beads $s\ s$ extend over the grate g, and at this point they are turned inward, so as to conduct the grain from both sides to the center.

All the grain falls onto the sieve J in the shoe K, the tailings, which have not passed through the sieve, passing out of a side spout to be carried up by an elevator and run through the machine again, while the clean grain, after passing through the sieve J, falls on the inclined board L, and from there to a conveyer, M, to be carried out at either side of the machine.

The shaker H and grain-receiver G are each supported upon a series of flat bars, $b'\ b'$, the ends of which are formed with tenons or rods $a'\ a'$, passing through slots $d'$ in the sides of the frame, and supported in hangers $f'$ on the outside of the frame.

To the edges of both the shaker and grain-receiver, on the under side, are secured slotted plates $e'$, which fit over the round tenons $a'$ against the shoulders on the bars $b'$, so as to cover the slots $d'$ and prevent dust from passing through.

N is the fan to blow out all chaff, dust, &c., in the usual manner.

The various parts of the separator are operated by means of belts, cranks, rods, and arms substantially as shown in the drawing, or arranged in any other suitable manner that will properly move them.

Having thus fully described my invention, what I claim as new, and desire to secure by Letters Patent, is—

1. The revolving rake, operating in combination with the straw-deflector S and shaker H, substantially as set forth.

2. The shaker having recesses $x$ in its edge at its lower end, and provided with the inclined flanged slides $n$, as and for the purposes set forth.

In testimony that I claim the foregoing as my own I affix my signature in presence of two witnesses.

LOUIS C. ROYER.

Witnesses:
T. H. ALEXANDER,
A. V. ELLIOTT.